(12) United States Patent
Heo et al.

(10) Patent No.: US 12,663,305 B2
(45) Date of Patent: Jun. 23, 2026

(54) APPARATUS AND METHOD FOR MEASURING AMOUNT OF HYDROGEN STORED IN STORAGE CONTAINER

(71) Applicants: Hyundai Motor Company, Seoul (KR); Kia Corporation, Seoul (KR)

(72) Inventors: Jin Young Heo, Hwaseong-Si (KR); Hai Jun Jeong, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 318 days.

(21) Appl. No.: 18/385,249

(22) Filed: Oct. 30, 2023

(65) Prior Publication Data

US 2025/0020498 A1     Jan. 16, 2025

(30) Foreign Application Priority Data

Jul. 10, 2023    (KR) ......................... 10-2023-0089307

(51) Int. Cl.
G01F 23/22 (2006.01)
G01K 1/143 (2021.01)

(52) U.S. Cl.
CPC ............. G01F 23/22 (2013.01); G01K 1/143 (2013.01)

(58) Field of Classification Search
CPC ...... G01F 23/22; G01F 23/246; G01F 23/247; G01F 23/248; G01K 1/143
See application file for complete search history.

(56) References Cited

U.S. PATENT DOCUMENTS

| | | | | |
|---|---|---|---|---|
| 2006/0021431 A1* | 2/2006 | Immel | ................... | F17C 13/021 |
| | | | | 73/304 C |
| 2019/0186977 A1* | 6/2019 | Mabee | .................. | G01F 23/248 |
| 2019/0390996 A1* | 12/2019 | Jallade | .................. | G01F 23/247 |
| 2022/0260432 A1* | 8/2022 | Leibig | ....................... | G01K 1/18 |
| 2024/0201020 A1* | 6/2024 | Vrdoljak | .................. | G01F 1/68 |

FOREIGN PATENT DOCUMENTS

| | | | | | |
|---|---|---|---|---|---|
| CN | 108362345 B | * | 2/2021 | .............. | G01K 1/00 |
| CN | 116046099 A | * | 5/2023 | ............. | G01F 23/00 |
| DE | 3632855 A1 | * | 3/1988 | ............. | G01F 23/22 |
| EP | 0908711 A1 | * | 4/1999 | ............. | G01K 1/143 |
| JP | 2001-093555 A | | 4/2001 | | |
| JP | 2021047209 A | * | 3/2021 | | |
| KR | 10-2008-0004967 A | | 1/2008 | | |
| KR | 101509971 B1 | * | 4/2015 | ............. | F17C 13/02 |
| KR | 10-2022640 B | | 9/2019 | | |
| WO | WO-2024218537 A1 | * | 10/2024 | ........... | G01F 23/802 |

* cited by examiner

*Primary Examiner* — Herbert K Roberts
(74) *Attorney, Agent, or Firm* — MORGAN, LEWIS & BOCKIUS LLP

(57) ABSTRACT

Provided are an apparatus and a method for measuring an amount of hydrogen stored in a storage container. The apparatus includes the storage container, in which the hydrogen is stored, a plurality of temperature sensors surrounding a surface of the storage container, and that measure surface temperatures for locations of the storage container, and a processor that estimates a liquid level of the hydrogen stored in the storage container, based on the surface temperatures for the locations.

19 Claims, 10 Drawing Sheets

: LIQUID HYDROGEN

: LIQUID HYDROGEN

APPARATUS AND METHOD FOR MEASURING AMOUNT OF HYDROGEN STORED IN STORAGE CONTAINER

CROSS-REFERENCE TO RELATED APPLICATION

The present application claims priority to Korean Patent Application No. 10-2023-0089307, filed on Jul. 10, 2023, the entire contents of which is incorporated herein for all purposes by this reference.

BACKGROUND OF THE PRESENT DISCLOSURE

Field of the Present Disclosure

The present disclosure relates to an apparatus and a method for measuring an amount of hydrogen stored in a storage container, and more particularly, to a technology for measuring an amount of hydrogen in a storage container through a non-through scheme.

Description of Related Art

A fuel cell vehicle travels while being driven by a motor by use of a fuel cell stack which produces electricity. A fuel cell stack produces electricity through an oxidation/reduction reaction of hydrogen and oxygen ($O_2$). Accordingly, the fuel cell vehicle may employ a hydrogen tank for supplying hydrogen to the fuel cell stack.

To measure fuel expenses of the fuel cell vehicle or calculate a travel allowable distance and the like, it is necessary to measure an amount of hydrogen stored in the hydrogen tank. In general, the amount of the hydrogen stored in the hydrogen tank is measured by use of a liquid level sensor mounted in an interior of a storage tank. To measure a liquid level of the hydrogen by use of the liquid level sensor, the liquid level sensor or a signal line has to pass through a storage container. A vacuum insulation portion may be formed between an internal vessel corresponding to the storage container and an external vessel that surrounds the internal vessel, and when a component for using the liquid level sensor passes through the storage container, a danger of leakage of the hydrogen occurs.

Furthermore, since the hydrogen in the hydrogen tank may be in a supercritical state when the vehicle is driven, it is impossible to accurately measure the amount of the hydrogen in the supercritical state when the liquid level sensor is used.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method configured for measuring an amount of hydrogen stored in a storage container, by which the amount of the hydrogen stored in the storage container may be measured while the apparatus does not pass through the storage container.

An aspect of the present disclosure also provides an apparatus and a method configured for measuring an amount of hydrogen stored in a storage container, by which the amount of the hydrogen in a supercritical state may be accurately measured.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus configured for measuring an amount of hydrogen stored in a storage container includes the storage container, in which the hydrogen is stored, a plurality of temperature sensors surrounding a surface of the storage container, and that measures surface temperatures for locations of the storage container, and a processor that estimates a liquid level of the hydrogen stored in the storage container, based on the surface temperatures for the locations.

According to an exemplary embodiment of the present disclosure, the plurality of temperature sensors may be fastened to the storage container by a belt having a predetermined tension or higher than the predetermined tension.

According to an exemplary embodiment of the present disclosure, the plurality of temperature sensors may include a first reference sensor located at an uppermost end portion of the storage container, a second reference sensor located at a lowermost end portion of the storage container, and a first sensor group including a plurality of first sensors located between the first reference sensor and the second reference sensor at different sites on the storage container.

According to an exemplary embodiment of the present disclosure, the apparatus may further include a pressure sensor configured for measuring an internal pressure of the storage container, and the processor may be configured to determine a phase of the hydrogen stored in the storage container, based on the internal pressure, and an internal temperature of the storage container, which is estimated from the surface temperatures for the locations.

According to an exemplary embodiment of the present disclosure, the processor may be configured to determine a total storage amount of the hydrogen so that the total storage amount is proportional to the liquid level of the hydrogen, an average density of the hydrogen, and a volume of the storage container, upon concluding that the hydrogen is in multi-phases.

According to an exemplary embodiment of the present disclosure, the processor may be configured to determine a temperature deviation obtained by, among the plurality of temperature sensors, a pair of sensors, and estimate the liquid level of the hydrogen, based on heights of the sensors, of which temperature deviations are a preset threshold temperature or higher than the preset threshold temperature.

According to an exemplary embodiment of the present disclosure, the apparatus may further include a second sensor group including a plurality of second sensors formed at locations that are symmetrical to locations of the plurality of first sensors of the first sensor group with respect to a reference line connecting the first reference sensor and the second reference sensor.

According to an exemplary embodiment of the present disclosure, the processor may be configured to detect a first liquid level point based on the heights of, among the plurality of first sensors pertaining to the first sensor group, the pair of sensors, of which a temperature deviation obtained by the pair of sensors is a preset threshold temperature or higher than the preset threshold temperature, detect a second liquid level point based on the heights of, among the plurality of first sensors pertaining to the second sensor group, the pair of sensors, of which a temperature deviation obtained by the pair of sensors is a preset threshold temperature or higher than the preset threshold temperature, and estimate the liquid level by correcting a height deviation of the first liquid level point and the second liquid level point when heights of the first liquid level point and the second liquid level point are different to each other.

According to an exemplary embodiment of the present disclosure, the processor may be configured to among the sensors pertaining to the first sensor group and the second sensor group, internal angles defined by an arbitrary pair of sensors and a center point of the reference line are the same.

According to an exemplary embodiment of the present disclosure, the processor may be configured for estimating the internal temperature based on the surface temperatures for the locations, and determine the average density of the hydrogen stored in the storage container, based on an average value of the internal temperatures and the internal pressure.

According to an exemplary embodiment of the present disclosure, the processor may be configured to determine an average value of the internal temperatures based on an average value of the temperatures obtained by, among the plurality of temperature sensors, sensors located at the liquid level or lower than the liquid level.

According to an exemplary embodiment of the present disclosure, the processor may be configured to determine an average density of the hydrogen based on an average value of the internal temperatures of the storage container, upon concluding that the hydrogen is in a single phase, and determine a total storage amount of the hydrogen, based on the average density of the hydrogen and a volume of the storage container.

According to an exemplary embodiment of the present disclosure, the processor may be configured to determine the average value of the internal temperatures by averaging temperatures obtained by the first reference sensor, the second reference sensor, and the plurality of first sensors pertaining to the first sensor group.

According to another aspect of the present disclosure, a method for measuring an amount of hydrogen stored in a storage container includes determining a phase of the hydrogen stored in the storage container, based on a pressure and a temperature of the storage container, determining temperature deviations for locations of the storage container, based on that the hydrogen is in multi-phases, determining a liquid level of the hydrogen, based on the temperature deviations for the locations of the storage container, and determining a total storage amount of the hydrogen stored in the storage container, based on the liquid level, an average density in an interior of the storage container, and a volume of the storage container.

According to an exemplary embodiment of the present disclosure, the determining of the temperature deviations for the locations of the storage container may include determining a difference between temperatures obtained by, among the plurality of temperature sensors for measuring the surface temperatures for the locations of the storage container, a pair of adjacent temperature sensors.

According to an exemplary embodiment of the present disclosure, the determining of the liquid level of the hydrogen may include estimating a height of a temperature sensor located at a lowest site as the liquid level of the hydrogen based on that a temperature deviation obtained by, among the plurality of temperature sensors, the pair of adjacent sensors is a threshold temperature or higher than the threshold temperature.

According to an exemplary embodiment of the present disclosure, the plurality of temperature sensors may include a first reference sensor located at an uppermost end portion of the storage container, a second reference sensor located at a lowermost end portion of the storage container, a plurality of first sensors located at different heights from one side of a reference line connecting the first reference sensor and the second reference sensor, and a plurality of second sensors formed at locations that are symmetrical to the plurality of first sensors with respect to the reference line, and the determining of the liquid level of the hydrogen may include estimating a first liquid level point by use of the plurality of first sensors, estimating a second liquid level by use of the plurality of second sensors, and estimating the liquid level by correcting a height deviation of the first liquid level point and the second liquid level point when heights of the first liquid level point and the second liquid level point are different to each other.

According to an exemplary embodiment of the present disclosure, the determining of the total storage amount of the hydrogen stored in the storage container may include estimating the internal temperature based on the surface temperatures for the locations, determining an average value of the internal temperatures, and determining the average density of the hydrogen stored in the storage container, based on the average value of the internal temperatures and the internal pressure.

According to an exemplary embodiment of the present disclosure, the estimating of the internal temperature may include converting the surface temperatures for the locations obtained by, among the plurality of temperature sensors, sensors located under the estimated liquid level.

According to an exemplary embodiment of the present disclosure, the method may further include determining an average value of internal temperatures of the storage container upon concluding that the hydrogen is in a single phase, determining the average density of the hydrogen based the average value of the internal temperatures, and determining the total storage amount so that the total storage amount is proportional to the average density of the hydrogen and the volume of the storage container.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
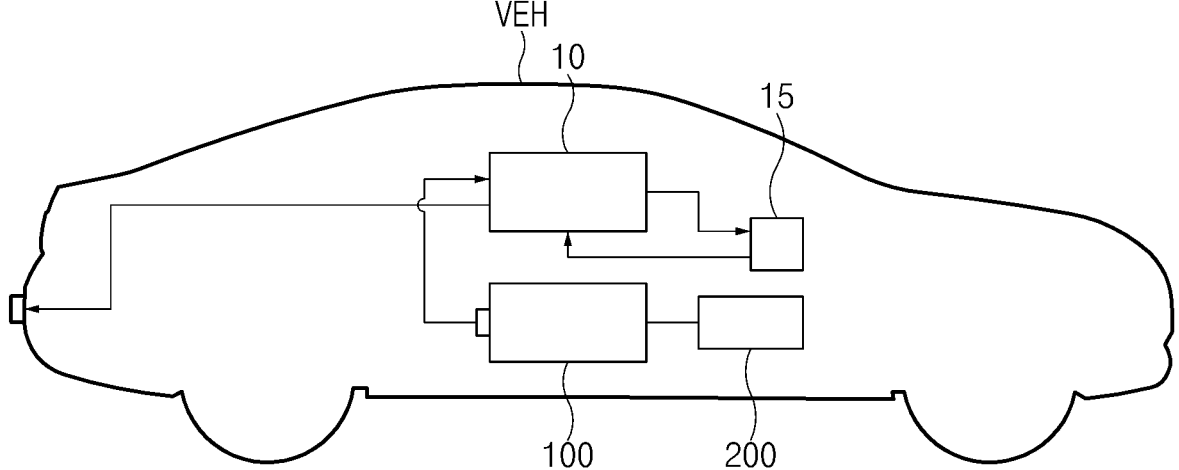
FIG. 1 is a view exemplarily illustrating an electric vehicle including a hydrogen amount measuring apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the exemplary embodiments of the present disclosure, when it is determined that a detailed description of related known configurations and functions may hinder understanding of the exemplary embodiments of the present disclosure, a detailed description thereof will be omitted.

Furthermore, in describing the components of the exemplary embodiments of the present disclosure. terms, such as first, second, "A", "B", (a), and (b) may be used. The terms are simply for distinguishing the components, and the essence, the sequence, and the order of the corresponding components are not limited by the terms. Furthermore, unless otherwise defined, all terms, including technical and scientific terms, used herein include the same meaning as commonly understood by those skilled in the art to which the present disclosure pertains. It will be further understood that terms, such as those defined in commonly used dictionaries, should be interpreted as having a meaning which is consistent with their meaning in the context of the specification and relevant art and should not be interpreted in an idealized or overly formal sense unless so defined herein.

Hereinafter, various exemplary embodiments of the present disclosure will be described in detail with reference to FIGS. 1 to 10.

Figure 2:
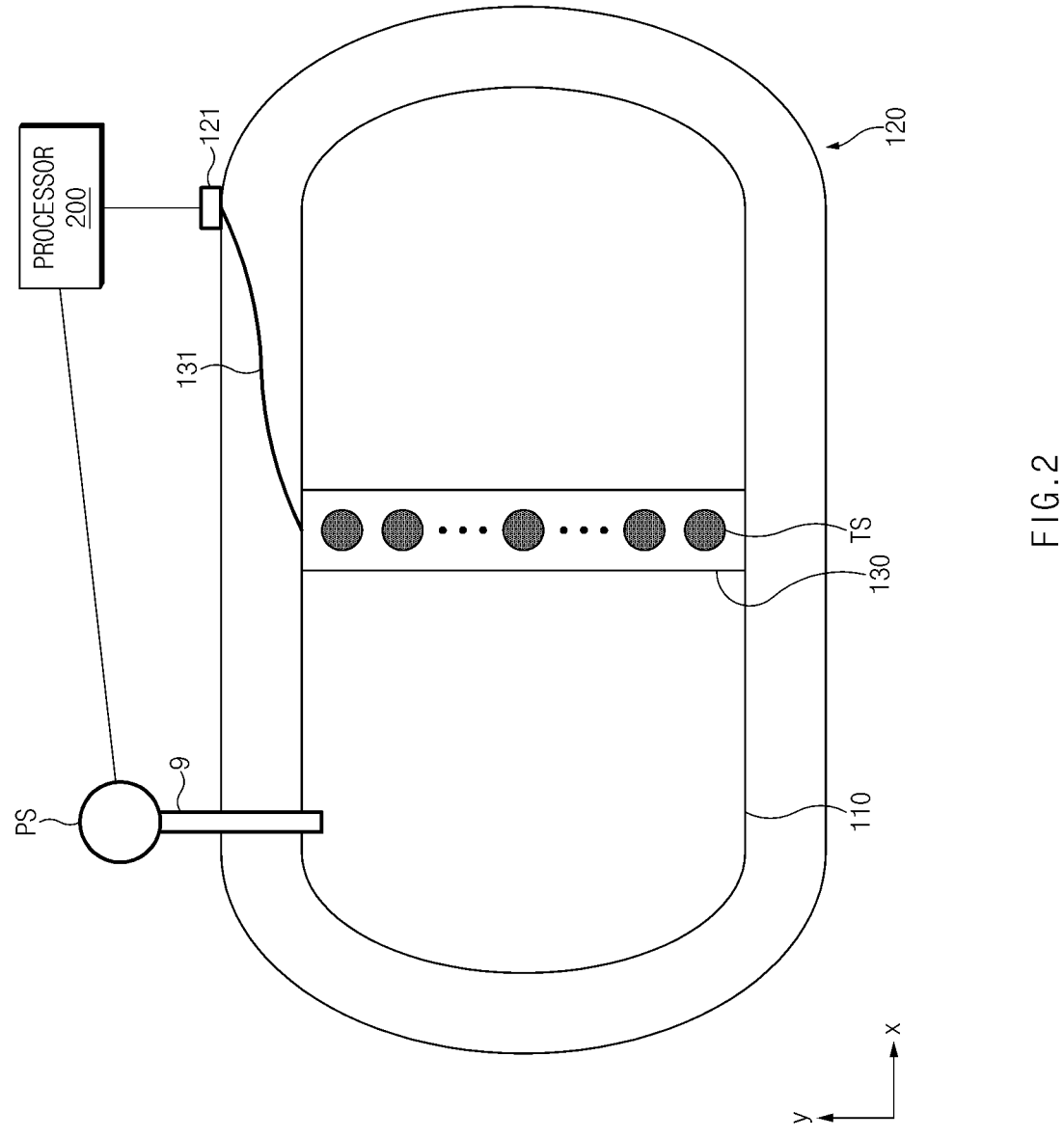
FIG. 2 is a view exemplarily illustrating a front surface of a hydrogen tank according to an exemplary embodiment of the present disclosure.

FIG. 1 is a view exemplarily illustrating an electric vehicle including a hydrogen amount measuring apparatus according to an exemplary embodiment of the present disclosure. FIG. 2 is a view exemplarily illustrating a front surface of a hydrogen tank according to an exemplary embodiment of the present disclosure.

Referring to FIG. 1 and FIG. 2, a hydrogen amount measuring apparatus according to an exemplary embodiment of the present disclosure may include a hydrogen tank 100 for supplying hydrogen to a fuel cell 10, and a processor 200 for estimating a storage amount of the hydrogen based on a temperature and a pressure of the hydrogen tank 100.

The fuel cell 10 may convert chemical energy into electrical energy as a fuel gas and oxygen electrochemically react with each other. The fuel cell 10 may include one or more fuel cells, and each of the fuel cells may receive hydrogen gas contained in a fuel gas and air to generate electrical energy while inducing oxidation and reduction reactions. The fuel cell may include a membrane electrode assembly (MEA) that oxidizes and reduces the hydrogen gas and the air while being protected from an outside by end plates, and one or more separators for supplying the fuel gas and the air to the membrane electrode assembly. The fuel cell 10 may include a stack structure, in which a plurality of fuel cells are stacked.

A driving device 15 may include one or more electric motors for rotating wheels of a vehicle.

The hydrogen tank 100 is provided in a vehicle VEH, and hydrogen of a high pressure is accommodated in an internal thereof. The hydrogen tank 100 may supply hydrogen to the fuel cell 10 through a supply pipe. As in FIG. 2, the hydrogen tank 100 may include a storage container 110, in which hydrogen is stored, and an external vessel 120 that protects the storage container 110 while surrounding the storage container 110.

The hydrogen tank 100 may include a pressure sensor PS which may measure an internal pressure of the storage container 110. The pressure sensor PS may pass through the storage container 110 and the external vessel 120, and one end portion thereof may be exposed to the storage container 110 and an opposite end portion thereof may be connected to a gas discharge pipeline 9 which is exposed to an outside of the external vessel 120.

The hydrogen tank 100 may include a plurality of temperature sensors TS that surround an outside of the storage container, in which the hydrogen is stored. The plurality of temperature sensors TS may be configured for measuring surface temperatures for locations of the storage container 110. To achieve this, the plurality of temperature sensors TS may be provided at different locations in the gravitational direction (the y axis direction). Intervals between the plurality of temperature sensors TS may be changed according to a resolution of an estimated liquid level of the hydrogen, and the plurality of temperature sensors TS may be disposed so that the intervals thereof are small to precisely estimate the liquid level.

The plurality of temperature sensors TS may be disposed at a center portion of the storage container 110 in a transverse direction (the x axis direction) to prevent the liquid level of the hydrogen from being inaccurately estimated due to sloshing. The sloshing phenomenon may mean a phenomenon, in which the hydrogen in the storage container 110 is shaken due to shaking of the vehicle VEH, and a change in the liquid level of the hydrogen due to the sloshing may increases as it goes toward an outside of the storage container 110. Accordingly, the plurality of temperature sensors TS may be disposed at the center portion of the storage container 110 in the transverse direction thereof.

The plurality of temperature sensors TS may be coupled to the storage container 110 by use of a fastening belt 130. The plurality of temperature sensors TS may be fixed to the fastening belt 130, and may contact with an outside of the storage container 110 when the fastening belt 130 is fastened to the storage container. The fastening belt 130 has a tension of a specific level or higher, and may use a plastic-based material.

Data obtained by the plurality of temperature sensors TS may be provided to the processor 200 through a data transmission line 131. The data transmission line 131 may be vacuum-fastened on an outside of the external vessel 120 by use of a feed-through port 121.

The processor 200 may estimate the liquid level of the hydrogen based on the surface temperatures for the locations of the storage container, which are obtained by the plurality of temperature sensors of the hydrogen tank 100.

The processor 200 may be configured to determine a total storage amount of the hydrogen so that the total storage amount is proportional to the liquid level of the hydrogen, an average density of the hydrogen, a volume of the storage container 110, based on a determination that the hydrogen in the storage container 110 is in multi-phases. The liquid level of the hydrogen may be estimated based on temperature deviations obtained by the adjacent temperature sensors TS. The average density of the hydrogen may be determined based on an average value of the internal temperatures and a pressure of the stored hydrogen. The average value of the internal temperatures of the hydrogen may mean an average temperature of the hydrogen in a liquid state, and may be determined based on an average of the temperatures obtained by the sensors located under the liquid level. To achieve this, the processor 200 may be configured to determine an internal temperature based on the surface temperatures obtained by the sensors located under the liquid level.

Hereinafter, a method configured for measuring a storage amount of hydrogen according to an exemplary embodiment of the present disclosure will be discussed below.

Figure 3:
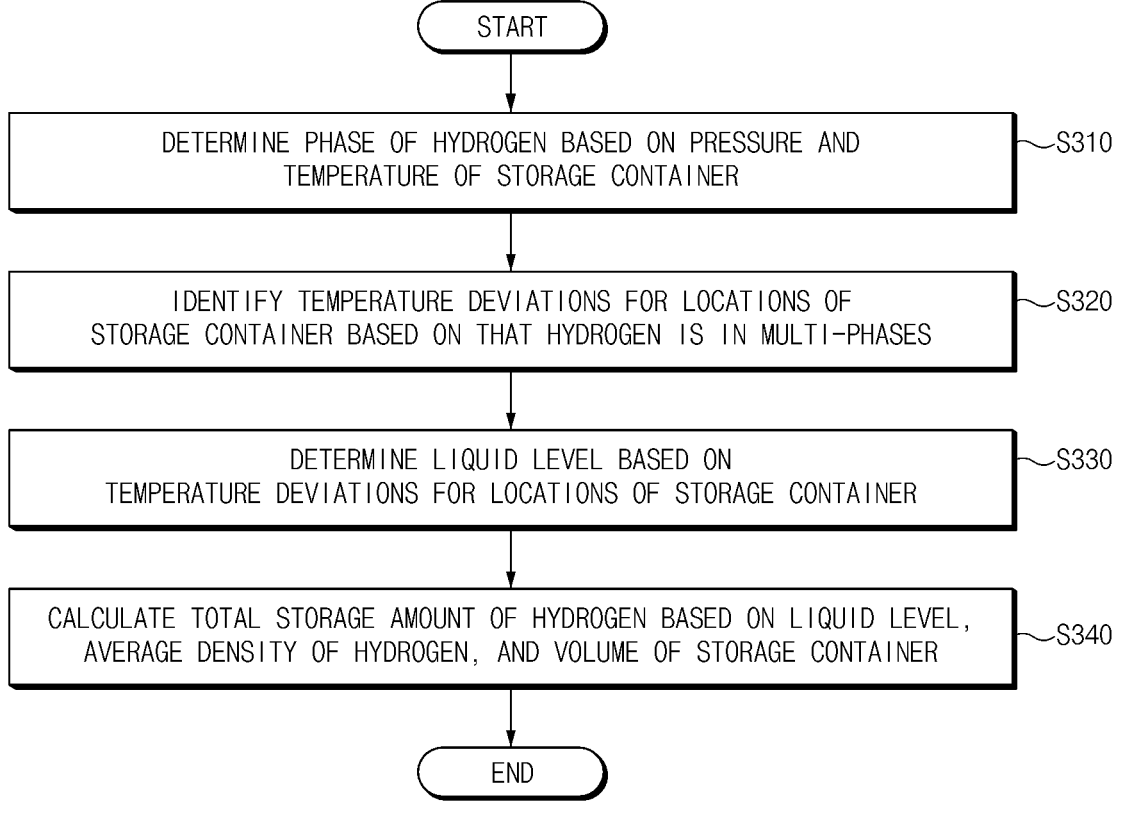
FIG. 3 is a flowchart illustrating a hydrogen storage amount measuring method according to an exemplary embodiment of the present disclosure.

FIG. 3 is a flowchart illustrating a hydrogen storage amount measuring method according to an exemplary embodiment of the present disclosure. FIG. 3 may correspond to procedures that are controlled by the processor.

In S310, the processor 200 may be configured to determine a phase of the hydrogen based on a pressure and a temperature of the storage container 110.

The processor 200 may be configured to determine whether the hydrogen stored in the storage container 110 is in a single phase based on the internal pressure of the storage container 110, which is obtained by a pressure sensor PS, and the internal temperatures of the storage container 110, which are obtained by the plurality of temperature sensors TS.

The processor 200 may be configured to determine that the hydrogen in the storage container 110 is in a single phase, based on that the internal pressure is a preset threshold pressure or higher and the internal temperature or the surface temperature of the storage container 110 is a preset threshold temperature or higher than the preset threshold temperature. The internal temperature may be determined based on the surface temperatures obtained by the plurality of temperature sensors TS.

Figure 4:
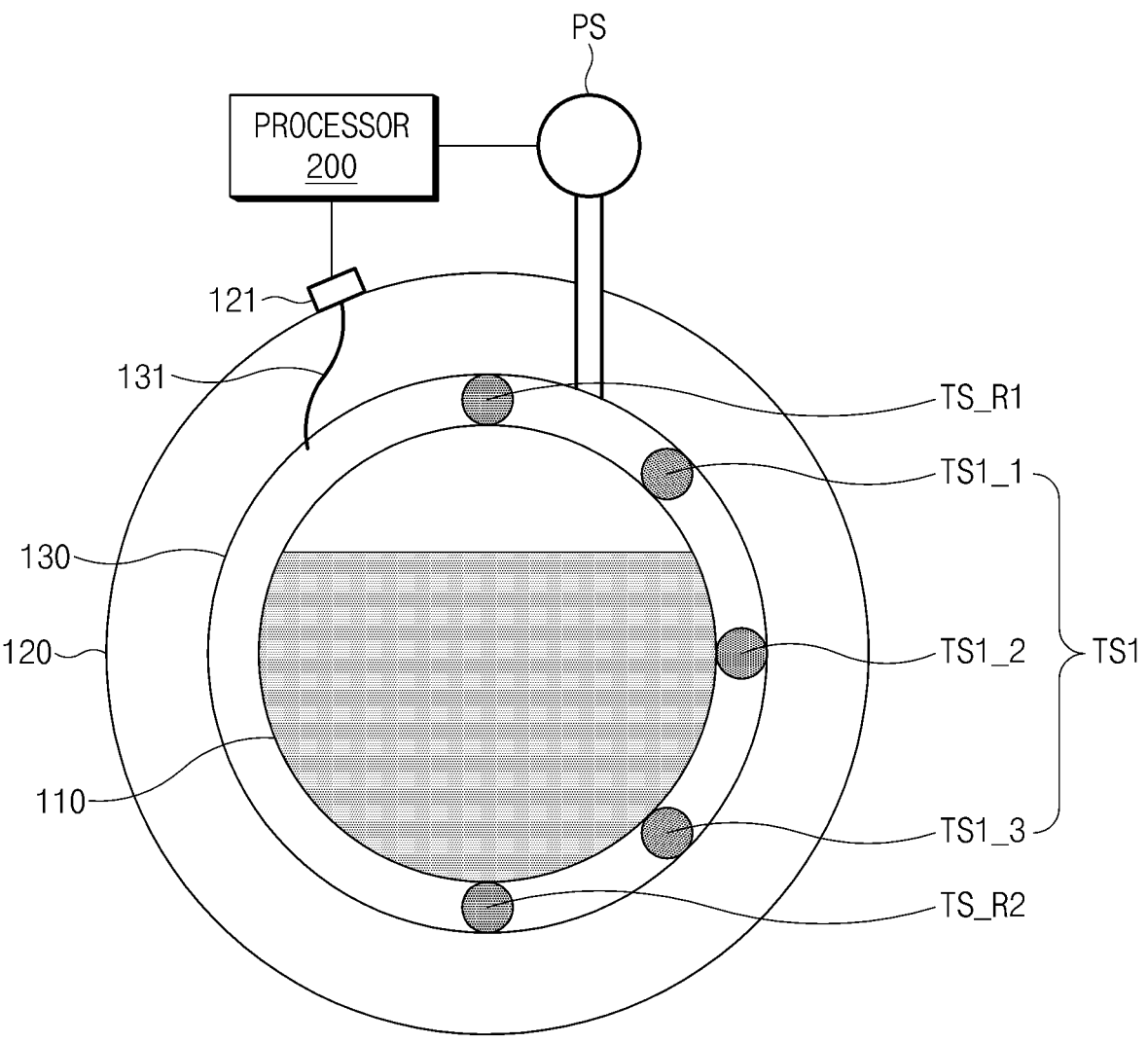
FIG. 4 is a view exemplarily illustrating disposition of temperature sensors according to various exemplary embodiments of the present disclosure.
Figure 5:
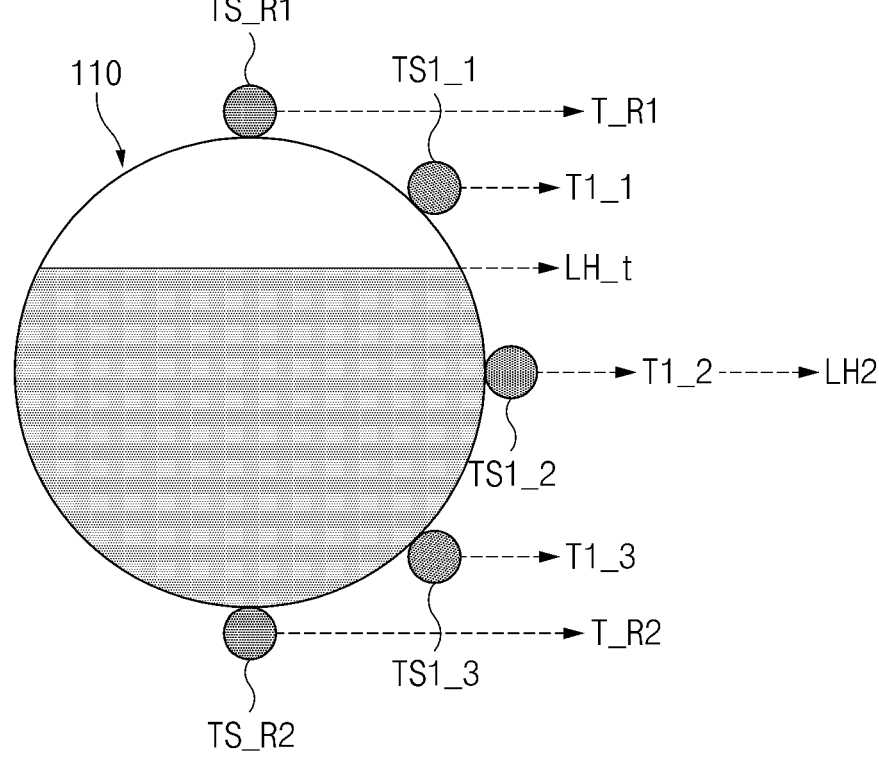
FIG. 5 is a view exemplarily illustrating a method for estimating surface temperatures for locations and liquid levels by use of the plurality of temperature sensors according to various exemplary embodiments.

The processor 200 may compare a surface temperature obtained by, among the plurality of temperature sensors TS, one temperature sensor TS, for example, a second reference sensor TS_R2 illustrated in FIG. 4 and FIG. 5, with a threshold temperature. Alternatively, the processor 200 may compare the internal temperature determined based on the surface temperature obtained by the second reference sensor TS_R2 with the threshold temperature. Alternatively, the processor 200 may compare an average value of the surface temperatures obtained by the two or more sensors, or an average value of the internal temperatures, which is determined based on the average value of the surface temperatures, with the threshold temperature. The threshold temperature may be set differently according to the internal temperature or the surface temperature which is a comparison target.

In S320, the processor 200 may identify temperature deviations for the locations of the storage container 110, based on that the hydrogen is in multi-phases.

The processor 200 may be configured to determine that the hydrogen in the storage container 110 is in multi-phases when the internal pressure is lower than a threshold pressure or the internal temperature is lower than the threshold temperature.

The processor 200 may obtain temperature deviations for the locations by determining the deviations of the temperatures obtained by, among the plurality of temperature sensors TS, the adjacent temperature sensors TS.

In S330, the processor 200 may be configured to determine the liquid level based on the temperature deviations for the locations of the storage container 110.

Operation S320 and operation S330 will be described in more detail with reference to FIG. 4, FIG. 5, FIG. 6, FIG. 7, and FIG. 8.

An exemplary embodiment of determining the liquid level according to an exemplary embodiment of the temperature sensor will be referred to as follows.

FIG. 4 is a view exemplarily illustrating disposition of temperature sensors according to various exemplary embodiments of the present disclosure, and FIG. 5 is a view exemplarily illustrating a method for estimating surface temperatures for locations and liquid levels by use of the plurality of temperature sensors according to various exemplary embodiments of the present disclosure.

Referring to FIG. 4 and FIG. 5, the plurality of temperature sensors TS according to the various exemplary embodiments of the present disclosure may include a first reference sensor TS_R1, the second reference sensor TS_R2, and a first sensor group TS1. The first sensor group TS1 may include "k" first sensors TS1_1, TS1_2, and TS1_3 (k is a natural number), and FIG. 4 illustrates the first group sensors including three sensors.

The processor 200 may receive surface temperatures for the locations from the plurality of temperature sensors TS. For example, the processor 200 may receive a first reference temperature T_R1 from the first reference sensor TS_R1 and a second reference temperature T_R2 from the second reference sensor TS_R2. Furthermore, the processor 200 may receive a (1-1)-th surface temperature T1_1 from the (1-1)-th sensor TS1_1, may receive a (1-2)-th surface temperature T1_2 from a (1-2)-th sensor TS1_2, and may receive a (1-3)-th surface temperature T1_3 from a (1-3)-th sensor TS1_3.

The processor 200 may be configured to determine a temperature deviation between the temperatures obtained by a pair of adjacent temperature sensors TS. For example, the processor 200 may be configured to determine a temperature deviation between the first reference temperature T_R1 and the (1-1)-th surface temperature T1_1, and may be configured to determine a temperature deviation between the (1-1)-th surface temperature T1_1 and the (1-2)-th surface temperature T1_2. Similarly, the processor 200 may be configured to determine a temperature deviation between the (1-3)-th surface temperature T1_3 and the second reference temperature T_R2.

The processor 200 may be configured to determine whether the temperature deviation between the pair of adjacent temperature sensors TS are a preset threshold value or more. The threshold value may be set to a value which is adjacent to 0.

As in FIG. 5, when an actual liquid level of the hydrogen corresponds to "LH_t", the (1-1)-th surface temperature T1_1 and the (1-2)-th surface temperature T1_2 may be different to each other. In the present way, when there occurs a temperature deviation in the pair of adjacent temperature sensors TS, the processor 200 may estimate a location of the temperature sensor disposed at a low location as a liquid level. To achieve this, the heights of the locations of the plurality of temperature sensors may be preset as in Table 1.

TABLE 1

| Sensors | Heights |
| --- | --- |
| (1-1)-th sensor | LH1 |
| (1-2)-th sensor | LH2 |
| (1-3)-th sensor | LH3 |

The height values of the plurality of temperature sensors TS may be measured with the assumption that the storage container 110 is in a horizontal state.

For example, a height LH2 of the (1-2)-th sensor TS1_2 may be estimated as the liquid level of the hydrogen.

A deviation may occur between the actual liquid level LH_t of the hydrogen and the estimated liquid level LH2 of the hydrogen, and the sensors may be densely disposed to increase an accuracy of the estimated liquid level LH2 of the hydrogen.

Figure 6:
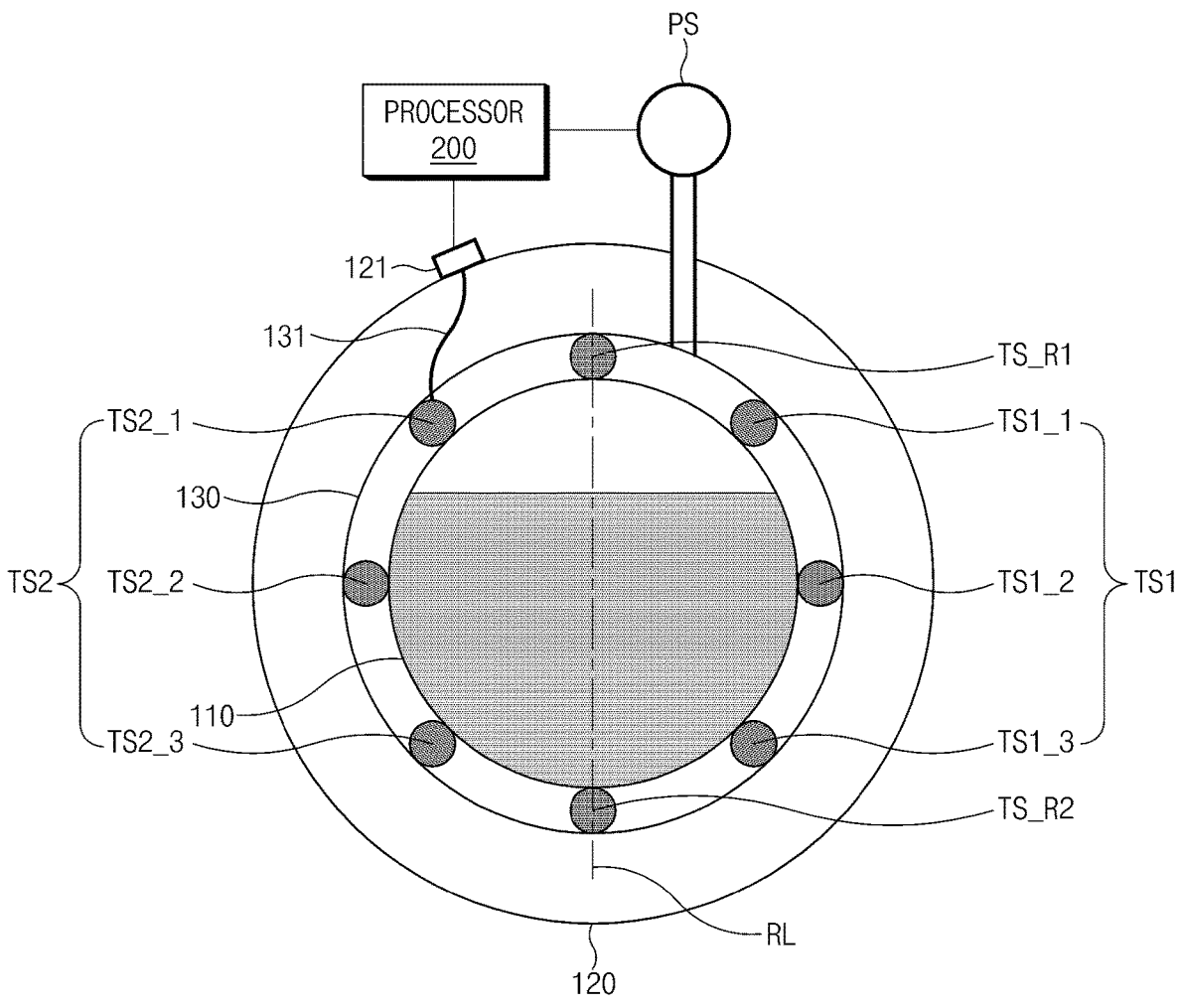
FIG. 6 is a view exemplarily illustrating disposition of temperature sensors according to various exemplary embodiments of the present disclosure.
Figure 7:
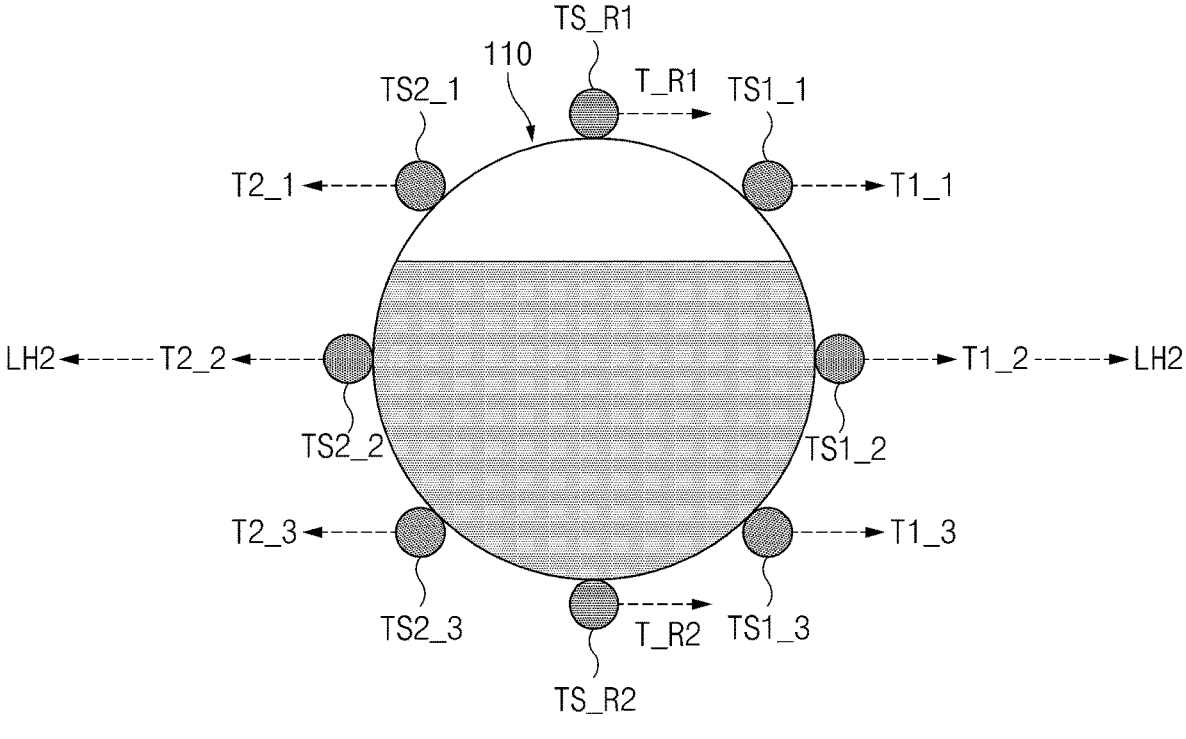
FIG. 7 and FIG. 8 are views exemplarily illustrating a method for estimating surface temperatures for locations and liquid levels by use of temperature sensors according to various exemplary embodiments.
Figure 8:
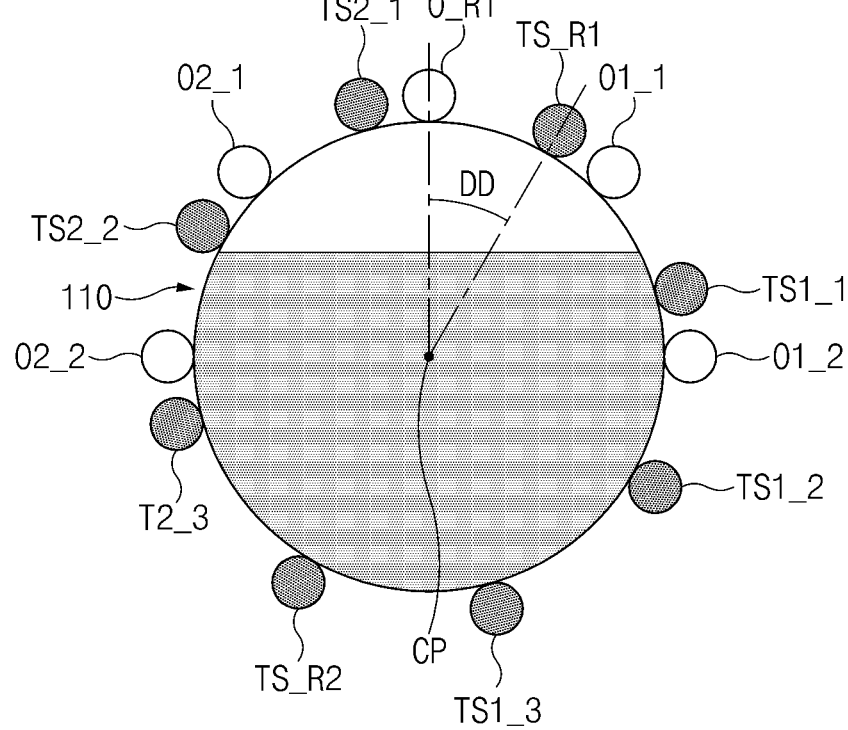

FIG. 6 is a view exemplarily illustrating disposition of temperature sensors according to various exemplary embodiments of the present disclosure. FIG. 7 and FIG. 8 are views exemplarily illustrating a method for estimating surface temperatures for locations and liquid levels by use of the plurality of temperature sensors according to various exemplary embodiments of the present disclosure.

Referring to FIG. 6, the plurality of temperature sensors TS according to the various exemplary embodiments of the present disclosure may include the first reference sensor TS_R1, the second reference sensor TS_R2, the first sensor group TS1, and a second sensor group TS2. The first sensor group TS1 may include a plurality of first sensors TS1_1, TS1_2, and TS1_3 that are located in a first area. The second sensor group TS2 may include a plurality of second sensors TS2_1, TS2_2, and TS2_3 that are located in a second area. The sensors of the first sensor group TS1 and the sensors of the second sensor group TS2 may be disposed at locations that are symmetrical to each other with respect to a reference line RL. For example, the (1-1)-th sensor TS1_1 and the (2-1)-th sensor TS2_1 may be disposed at locations that are symmetrical to each other with respect to the reference line RL. When a transverse direction of the storage container 110 is parallel to a road surface, the reference line RL may face the gravitational direction.

The processor 200 may receive surface temperatures for locations from the plurality of temperature sensors TS. For example, the processor 200 may receive the first reference temperature T_R1 from the first reference sensor TS_R1, and the second reference temperature T_R2 from the second reference sensor TS_R2. Furthermore, the processor 200 may receive the (1-1)-th surface temperature T1_1 from the (1-1)-th sensor TS1_1, may receive the (1-2)-th surface temperature T1_2 from the (1-2)-th sensor TS1_2, and may receive the (1-3)-th surface temperature T1_3 from the (1-3)-th sensor TS1_3.

Furthermore, the processor 200 may receive a (2-1)-th surface temperature T2_1 from the (2-1)-th sensor TS2_1, may receive a (2-2)-th surface temperature T2_2 from the (2-2)-th sensor TS2_2, and may receive a (2-3)-th surface temperature T2_3 from the (2-3)-th sensor TS2_3.

The processor 200 may be configured to determine a temperature deviation between the temperatures obtained by the pair of adjacent temperature sensors TS.

The processor 200 may detect a first liquid level point corresponding to the estimated liquid level based on the temperature deviations between the plurality of temperature sensors in the first area.

For example, the processor 200 may be configured to determine a temperature deviation between the first reference temperature T_R1 and the (1-1)-th surface temperature T1_1, and may be configured to determine a temperature deviation between the (1-1)-th surface temperature T1_1 and the (1-2)-th surface temperature T1_2. Furthermore, the processor 200 may be configured to determine a temperature deviation between the (1-3)-th surface temperature T1_3 and the second reference temperature T_R2.

As in FIG. 7, the processor 200 may detect a location, at which the (1-2)-th sensor TS1_2 is disposed as the first liquid level point.

Furthermore, the processor 200 may detect a second liquid level point corresponding to the estimated liquid level based on the temperature deviations between the plurality of temperature sensors in the second area.

For example, the processor 200 may be configured to determine a temperature deviation between the first reference temperature T_R1 and the (2-1)-th surface temperature T2_1, and may be configured to determine a temperature deviation between the (2-1)-th surface temperature T2_1 and the (2-2)-th surface temperature T2_2. Similarly, the processor 200 may be configured to determine a temperature deviation between the (2-3)-th surface temperature T2_3 and the second reference temperature T_R2.

As shown in FIG. 7, a height LH2 of the (2-2)-th sensor TS2_2 may be detected as the second liquid level point.

To estimate the liquid level based on the first liquid level point and the second liquid level point, the height values according to the locations, at which the plurality of temperature sensors TS are disposed may be set in advance. The sensors of the second sensor group TS2, which are symmetrical to the sensors of the first sensor group TS1, may be set to include the same height values as those of the sensors of the first sensor group TS1. For example, the (1-1)-th sensor TS1_1 and the (2-1)-th sensor TS2_1 may be set to include the same height value, and the (1-2)-th sensor TS1_2 and the (2-2)-th sensor TS2_2 may be set to include the same height value. The height values of the plurality of temperature sensors TS may be measured with the assumption that the storage container 110 is in a horizontal state.

The (1-2)-th sensor TS1_2 and the (2-2)-th sensor TS2_2 may be located at the same height. In the present way, when a height of the first liquid level point and a height of the second liquid level point are the same, the processor 200 may estimate the height of the first liquid level point as the liquid level of the hydrogen.

Unlike this, as in FIG. 8, the first liquid level point and the second liquid level point may be determined as different heights. An exemplary embodiment of determining the first liquid level point and the second liquid level point as different heights will be discussed as follows.

Referring to FIG. 8, when a transverse direction of the storage container 110 is parallel to the road surface, the first reference sensor TS_R1 and the second reference sensor TS_R2 may be located on a vertical line that passes through a center portion CP of the storage container 110. The vertical line may be a straight line in the gravitational direction. When the vehicle VEH is inclined with respect to the road surface, the plurality of temperature sensors TS may be located at sites that deviate from an initial location by a rotation angle DD. For example, the first reference sensor TS_R1 may be located at a site that deviates from an initial location O_R1 by the rotation angle DD.

The O_R1, O1_1, O1_2, O2_1, and O2_2 are the initial locations of the first reference sensor TS_R1, the (1-1)-th sensor TS1_1, the (1-2)-th sensor TS1_2, the (2-1)-th sensor TS2_1, and the (2-2)-th sensor TS2_2, respectively.

When the plurality of temperature sensors TS deviate from the initial location, the heights of the first liquid level point and the second liquid level point may be different to each other. As in FIG. 8, the first liquid level point of the first area, at which the temperature deviation occurs, may be a height of the (1-1)-th sensor TS1_1. Furthermore, the second liquid level point of the second area, at which the temperature deviation occurs, may be a height of the (2-2)-th sensor TS2_2. Because the height of the (1-1)-th sensor TS1_1 and the (2-2)-th sensor TS2_2 are set to be different, the processor 200 may be configured to determine that the heights of the first liquid level point and the second liquid level point are different to each other.

The reason why the heights of the first liquid level point and the second liquid level point appear differently is that the storage container 110 is inclined.

The processor 200 may estimate the liquid level by correcting a deviation of the heights of the first liquid level point and the second liquid level point when the heights of the first liquid level point and the second liquid level point are different to each other.

For example, when a difference value between the locations of the first reference sensor TS_R1 and the plurality of temperature sensors TS is assumed to be 1, the difference value of the first liquid level point in FIG. 8 may be 1 and the difference value of the second liquid level point may be 3. The processor 200 may be configured to determine an average of the difference value of the location of the first liquid level point and the difference value of the location of the second liquid level point, and may be configured to determine a height of the temperature sensor TS corresponding to the average location difference value as the liquid level. For example, the processor 200 may estimate the height of the (1-2)-th sensor TS1_2 as the liquid level when the average location difference value is 2.

In S340, the processor 200 may be configured to determine the total storage amount of the hydrogen based on the liquid level, the average density of the hydrogen, and the volume of the storage container.

The processor 200 may be configured to determine the average density of the liquid hydrogen stored in the storage container 110, based on the average value of the internal temperatures and the internal pressure.

The average value of the internal temperature may be obtained by converting the average value of the surface temperatures for the locations of the storage container 110 with an internal temperature conversion equation.

The average value of the surface temperatures for the locations of the storage container 110 may be an average value of the surface temperatures obtained by the plurality of temperature sensors TS disposed under the liquid level. For example, as in FIG. 7, when the plurality of temperature sensors TS disposed under the liquid level are the (1-2)-th sensor TS1_2, the (1-3)-th sensor TS1_3, the (2-2)-th sensor TS2_2, the (2-3)-th sensor TS2_3, and the second reference sensor TS_R2, the processor 200 may be configured to determine the average value of the surface temperatures for the locations by averaging the surface temperatures obtained by the (1-2)-th sensor TS1_2, the (1-3)-th sensor TS1_3, the (2-2)-th sensor TS2_2, the (2-3)-th sensor TS2_3, and the second reference sensor TS_R2.

The processor 200 may convert the average value of the surface temperatures for the locations to the average value of the internal temperatures, by use of Equation 1 below.

$$T_{in,x} = T_{s,x} - \frac{Q_{tank} \cdot t_{tank}}{k_{tank,in} \cdot A_{tank,in}} \qquad \text{[Equation 1]}$$

In Equation 1, $T_{in,x}$ may mean the internal temperature, and $T_{s,x}$ may mean the surface temperatures for the locations. $Q_{tank}$ may mean an amount of introduced heat of the storage container, and $t_{tank}$ may mean a thickness of the storage container 110. $k_{tank,in}$ may mean a thermal conductivity of the storage container 110, and $A_{tank,in}$ may mean a surface area of the storage container 110.

The total storage amount of the hydrogen may be determined to be proportional to the liquid level, the average density of the hydrogen, and the volume of the storage container. For example, the processor 200 may be configured to determine the total storage amount of the hydrogen in multi-phases by use of Equation 2 below.

$$\text{total storage amount} = \text{liquid level} \cdot \rho\left(T_{in,x-x'}, P\right) \cdot V_{tank} \qquad \text{[Equation 2]}$$

$\rho(T_{in,x-x'}, P)$ may mean the average density of the liquid hydrogen, and $V_{tank}$ may mean the volume of the storage container.

Figure 9:
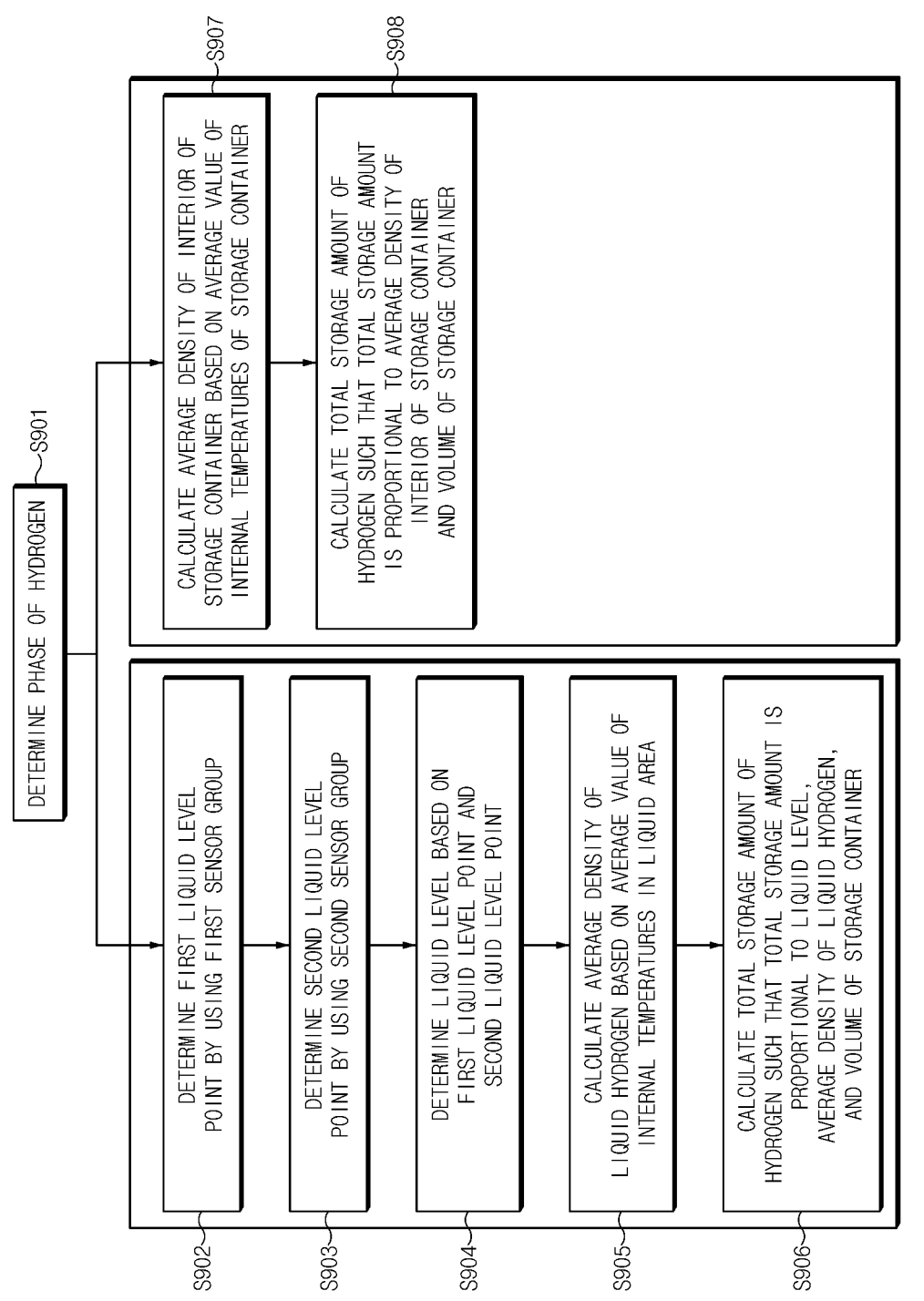
FIG. 9 is a flowchart illustrating a method for measuring a storage amount of hydrogen according to another exemplary embodiment of the present disclosure.

FIG. 9 is a flowchart illustrating a method for measuring a storage amount of hydrogen according to another exemplary embodiment of the present disclosure. FIG. 9 may correspond to procedures that are controlled by the processor. Referring to FIGS. 6 and 9, a method for measuring a storage amount of hydrogen according to the another exemplary embodiment of the present disclosure will be discussed as follows.

In S901, the processor 200 may be configured to determine a phase of the hydrogen.

The processor 200 may be configured to determine that the hydrogen of the storage container 110 is in a single phase based on that the internal pressure of the storage container 110 is a preset threshold pressure or higher and the internal temperature of the storage container 110 is a preset threshold temperature or higher than the preset threshold temperature.

Furthermore, the processor 200 may be configured to determine that the hydrogen in the storage container 110 is in a single phase based on that the internal pressure of the storage container 110 is lower than a preset threshold pressure and the internal temperature of the storage container 110 is less than a preset threshold temperature.

In S902, the processor 200 may be configured to determine a first liquid level point by use of the first sensor group.

The first sensor group TS1 may include temperature sensors that are disposed in one direction of the reference line RL that connects the first reference sensor TS_R1 and the second reference sensor TS_R2.

The processor 200 may detect a height of a temperature sensor which is located at a small height from a point, at which temperature deviations between the adjacent temperature sensors occur in the first sensor group TS1, as the first liquid level point.

Furthermore, the processor 200 may be configured to determine the temperature deviation of the first reference sensor TS_R1 at the largest height and the (1-1)-th sensor TS1_1 to detect the first liquid level point. Furthermore, the processor 200 may be configured to determine the temperature deviation of the second reference sensor TS_R2 at the smallest height and the (1-3)-th sensor TS1_3 to detect the first liquid level point.

In S903, the processor 200 may be configured to determine a second liquid level point by use of the second sensor group.

The second sensor group TS2 may include temperature sensors that are disposed at locations that are symmetrical to the first sensor group TS1 with respect to the reference line RL.

The processor 200 may detect a height of a temperature sensor which is located at a small height from a point, at which temperature deviations between the adjacent temperature sensors occur in the second sensor group TS2, as the second liquid level point.

Furthermore, the processor 200 may be configured to determine the temperature deviation of the first reference sensor TS_R1 at the largest height and the (2-1)-th sensor TS2_1 to detect the second liquid level point.

Furthermore, the processor 200 may be configured to determine the temperature deviation of the second reference sensor TS_R2 at the smallest height and the (2-3)-th sensor TS2_3 to detect the second liquid level point.

In S904, the processor 200 may be configured to determine the liquid level based on the first liquid level point and the second liquid level point.

When the first liquid level point and the second liquid level point are of the same height, the processor 200 may estimate the first liquid level point or the second liquid level point as the liquid level.

When the first liquid level point and the second liquid level point are different, the processor 200 may estimate the liquid level by correcting a deviation of the first liquid level point and the second liquid level point. For example, the processor 200 may estimate an average value of the first liquid level point and the second liquid level point as the liquid level.

In S905, the processor 200 may be configured to determine an average density of the liquid hydrogen based on an average value of the internal temperatures of the liquid area.

The processor 200 may be configured to determine the average value of the internal temperatures by converting the average value of the surface temperatures for the locations of the storage container 110 by use of an internal temperature conversion equation. The average value of the surface temperatures for the locations of the storage container 110 may be an average value of the surface temperatures obtained by the plurality of temperature sensors TS disposed under the liquid level.

Alternatively, the processor 200 may convert the surface temperatures for the locations of the storage container 110 to internal temperatures, and may be configured to determine an internal temperature average value of the liquid area by averaging the internal temperatures obtained through the conversion.

To determine the internal temperatures or the internal temperature average value, the processor 200 may use Equation 1 above.

In S906, the processor 200 may be configured to determine the total storage amount of the hydrogen so that the total storage amount is proportional to the liquid level, the average density of the liquid hydrogen, and the volume of the storage container.

In S907, the processor 200 may be configured to determine an average density of an interior of the storage container based on the average value or the internal temperatures of the storage container 110 when it is determined that the hydrogen stored in the storage container 110 is in a single phase.

When the hydrogen is in the single phase, the average value of the internal temperatures may be obtained by converting the average value of the surface temperatures obtained by all the plurality of temperature sensors TS, by use of Equation 1. That is, the processor 200 may be configured to determine the average value of the surface temperatures obtained by the first reference sensor TS_R1, the first sensor group TS1, the second sensor group TS2, and the second reference sensor TS_R2, and may be configured to determine the average value of the internal temperatures by converging the average value of the surface temperature based on Equation 1.

In S908, the processor 200 may be configured to determine the total storage amount of the hydrogen so that the total storage amount is proportional to the average density of the interior of the storage container, and the volume of the storage container.

That is, the processor 200 may be configured to determine the total storage amount in the single phase by use of Equation 3 below.

$$\text{total storage amount} = \rho(T_{in,\,tank}, P) \cdot V_{tank} \qquad \text{[Equation 3]}$$

In Equation 3, $\rho(T_{in,tank}, P)$ may mean the average density of the interior of the storage container.

Figure 10:
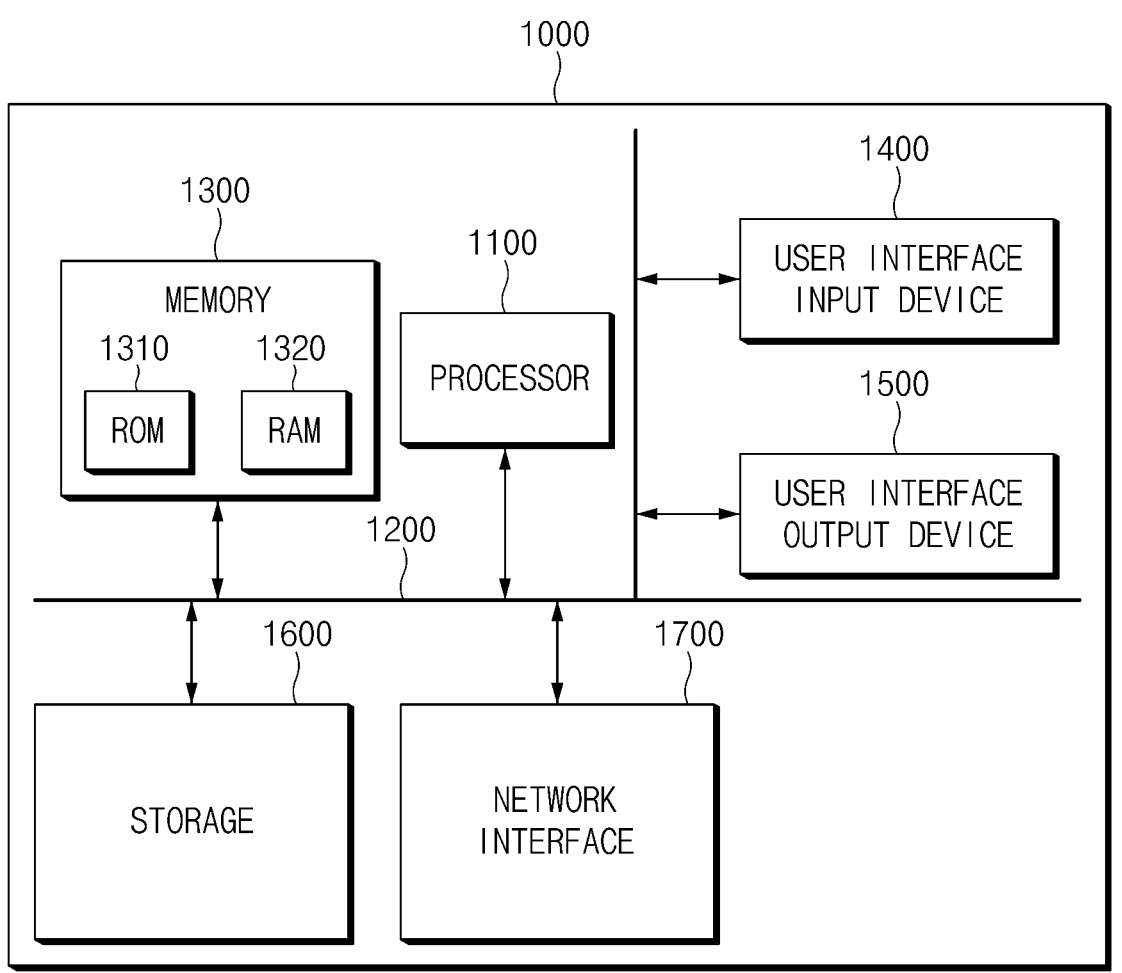
FIG. 10 is a view exemplarily illustrating a computing system according to an exemplary embodiment of the present disclosure.

FIG. 10 is a view exemplarily illustrating a computing system according to an exemplary embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected through a system bus 1200.

The processor 1100 may be a central processing unit (CPU), or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an exemplary embodiment of the present disclosure, the amount of the hydrogen may be measured while the apparatus does not pass through the storage container by measuring the amount of the hydrogen stored in the storage container by use of the plurality of temperature sensors coupled to an outside of the storage container.

According to an exemplary embodiment of the present disclosure, the amount of the hydrogen may be accurately measured even when the hydrogen is in a supercritical state which is a single phase, by differently setting the method for measuring the amount of the hydrogen according to the phase of the hydrogen in the storage container.

Furthermore, various effects directly or indirectly recognized through the specification may be provided.

The above description is a simple exemplification of the technical spirits of the present disclosure, and the present disclosure may be variously corrected and modified by those skilled in the art to which the present disclosure pertains without departing from the essential features of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for measuring an amount of hydrogen stored in a storage container, the apparatus comprising:
the storage container, in which the hydrogen is stored;
a plurality of temperature sensors surrounding a surface of the storage container, and configured for measuring surface temperatures for locations of the storage container; and
a pressure sensor configured for measuring an internal pressure of the storage container, and
a processor operatively connected to the plurality of temperature sensors and configured to:
estimate a liquid level of the hydrogen stored in the storage container, based on the surface temperatures for the locations; and
determine a phase of the hydrogen stored in the storage container, based on the internal pressure, and an internal temperature of the storage container, which is estimated from the surface temperatures for the locations.

2. The apparatus of claim 1, wherein the plurality of temperature sensors are fastened to the storage container by a belt having a predetermined tension or higher than the predetermined tension.

3. The apparatus of claim 1, wherein the plurality of temperature sensors include:

a first reference sensor located at an uppermost end portion of the storage container;

a second reference sensor located at a lowermost end portion of the storage container; and a first sensor group including a plurality of first sensors located between the first reference sensor and the second reference sensor at different sites on the storage container.

4. The apparatus of claim 3, wherein the processor is further configured to:

determine a total storage amount of the hydrogen, upon concluding that the hydrogen is in multi-phases so that the total storage amount is proportional to the liquid level of the hydrogen, an average density of the hydrogen, and a volume of the storage container.

5. The apparatus of claim 4, wherein the processor is further configured to:

determine a temperature deviation obtained by a pair of sensors among the plurality of temperature sensors; and estimate the liquid level of the hydrogen, based on heights of the sensors, of which temperature deviations are a preset threshold temperature or higher than the preset threshold temperature.

6. The apparatus of claim 4, further including:

a second sensor group including a plurality of second sensors formed at locations that are symmetrical to locations of the plurality of first sensors of the first sensor group with respect to a reference line connecting the first reference sensor and the second reference sensor.

7. The apparatus of claim 6, wherein the processor is further configured to:

detect a first liquid level point based on heights of, among the plurality of first sensors pertaining to the first sensor group, a pair of sensors, of which a temperature deviation obtained by the pair of sensors is a preset threshold temperature or higher than the preset threshold temperature;

detect a second liquid level point based on heights of, among the plurality of first sensors pertaining to the second sensor group, a pair of sensors, of which a temperature deviation obtained by the pair of sensors is a preset threshold temperature or higher than the preset threshold temperature; and estimate the liquid level by correcting a height deviation of the first liquid level point and the second liquid level point in a situation which heights of the first liquid level point and the second liquid level point are different to each other.

8. The apparatus of claim 6, wherein the processor is further configured to:

among the sensors pertaining to the first sensor group and the second sensor group, internal angles defined by an arbitrary pair of sensors adjacent to each other and a center point of the reference line are a same.

9. The apparatus of claim 4, wherein the processor is further configured to:

estimate the internal temperature based on the surface temperatures for the locations; and

18 determine the average density of the hydrogen stored in the storage container, based on an average value of internal temperatures and the internal pressure.

10. The apparatus of claim 9, wherein the processor is further configured to:

determine an average value of the internal temperatures based on an average value of the temperatures obtained by sensors located at the liquid level or lower than the liquid level among the plurality of temperature sensors.

11. The apparatus of claim 1, wherein the processor is further configured to:

determine an average density of the hydrogen based on an average value of internal temperatures of the storage container, upon concluding that the hydrogen is in a single phase; and determine a total storage amount of the hydrogen, based on the average density of the hydrogen and a volume of the storage container.

12. The apparatus of claim 11, wherein the processor is further configured to:

determine the average value of the internal temperatures by averaging temperatures obtained by the first reference sensor, the second reference sensor, and the plurality of first sensors pertaining to the first sensor group.

13. A method for measuring an amount of hydrogen stored in a storage container, the method comprising:

determining, by a processor, a phase of the hydrogen stored in the storage container, based on a pressure and a temperature of the storage container;

determining, by the processor, temperature deviations for locations of the storage container, based on that the hydrogen is in multi-phases;

determining, by the processor, a liquid level of the hydrogen, based on the temperature deviations for the locations of the storage container; and determining, by the processor, a total storage amount of the hydrogen stored in the storage container, based on the liquid level, an average density in an interior of the storage container, and a volume of the storage container.

14. The method of claim 13, wherein the determining of the temperature deviations for the locations of the storage container includes:

determining a difference between temperatures obtained by a pair of adjacent temperature sensors among a plurality of temperature sensors for measuring surface temperatures for the locations of the storage container.

15. The method of claim 14, wherein the determining of the liquid level of the hydrogen includes:

estimating a height of a temperature sensor located at a lowest site as the liquid level of the hydrogen based on that a temperature deviation obtained by a pair of adjacent sensors among the plurality of temperature sensors is a threshold temperature or higher than the threshold temperature.

16. The method of claim 15, wherein the plurality of temperature sensors include:

a first reference sensor located at an uppermost end portion of the storage container;

a second reference sensor located at a lowermost end portion of the storage container;

a plurality of first sensors located at different heights from one side of a reference line connecting the first reference sensor and the second reference sensor; and a plurality of second sensors formed at locations that are symmetrical to the plurality of first sensors with respect to the reference line, and wherein the determining of the liquid level of the hydrogen includes:

estimating a first liquid level point by use of the plurality of first sensors;

estimating a second liquid level by use of the plurality of second sensors; and estimating the liquid level by correcting a height deviation of the first liquid level point and the second liquid level point in a situation which heights of the first liquid level point and the second liquid level point are different to each other.

17. The method of claim 13, wherein the determining of the total storage amount of the hydrogen stored in the storage container includes:

estimating an internal temperature based on surface temperatures for the locations;

determining an average value of internal temperatures; and determining the average density of the hydrogen stored in the storage container, based on the average value of the internal temperatures and an internal pressure of the storage container.

18. The method of claim 17, wherein the estimating of the internal temperature includes:

converting the surface temperatures for the locations obtained by sensors located under the estimated liquid level among the plurality of temperature sensors.

19. The method of claim 13, further including:

determining, by the processor, an average value of internal temperatures of the storage container upon concluding that the hydrogen is in a single phase;

determining, by the processor, the average density of the hydrogen based on the average value of the internal temperatures; and determining, by the processor, the total storage amount so that the total storage amount is proportional to the average density of the hydrogen and the volume of the storage container.

* * * * *